United States Patent
Lee et al.

(10) Patent No.: US 11,198,102 B2
(45) Date of Patent: Dec. 14, 2021

(54) METHOD FOR PRODUCING COMPOSITION FOR FORMING GAS SEPARATION MEMBRANE ACTIVE LAYER, COMPOSITION FOR FORMING GAS SEPARATION MEMBRANE ACTIVE LAYER PRODUCED BY SAME, METHOD FOR MANUFACTURING GAS SEPARATION MEMBRANE, AND GAS SEPARATION MEMBRANE

(71) Applicant: LG CHEM, LTD., Seoul (KR)

(72) Inventors: Byoungsoo Lee, Daejeon (KR); Sora Bang, Daejeon (KR); Chong Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 130 days.

(21) Appl. No.: 16/644,068

(22) PCT Filed: Nov. 30, 2018

(86) PCT No.: PCT/KR2018/015128
§ 371 (c)(1),
(2) Date: Mar. 3, 2020

(87) PCT Pub. No.: WO2019/112259
PCT Pub. Date: Jun. 13, 2019

(65) Prior Publication Data
US 2021/0060500 A1      Mar. 4, 2021

(30) Foreign Application Priority Data

Dec. 4, 2017  (KR) .................. 10-2017-0165055

(51) Int. Cl.
*B01D 53/22* (2006.01)
*B01D 71/16* (2006.01)
*B01D 69/12* (2006.01)

(52) U.S. Cl.
CPC .......... *B01D 71/16* (2013.01); *B01D 53/228* (2013.01); *B01D 69/125* (2013.01)

(58) Field of Classification Search
CPC ..... B01D 69/125; B01D 71/16; B01D 53/228
See application file for complete search history.

(56) References Cited

U.S. PATENT DOCUMENTS 4,549,012 A   10/1985 Sharma
4,881,954 A   11/1989 Bikson et al.
(Continued)

FOREIGN PATENT DOCUMENTS

CN   101277754   10/2008
CN   104277122    1/2015
(Continued)

OTHER PUBLICATIONS

Liebert et al., "Readily hydrolysable cellulose esters as intermediates for the regioselective derivatization of cellulose; II. Soluble, highly substituted cellulose trifluoroacetates," Cellulose 1:249-258 (1994).

(Continued)

*Primary Examiner* — Anthony R Shumate
(74) *Attorney, Agent, or Firm* — Dentons US LLP

(57) ABSTRACT

Provided is a method for producing a composition for forming a gas separation membrane active layer, the method including: obtaining a first reactant by allowing a cellulose-based compound and an acid substituted with fluorine to react; and adding dropwise an acid anhydride substituted with fluorine to the first reactant at a temperature higher than room temperature. Also provided is a composition for forming a gas separation membrane active layer.

20 Claims, 1 Drawing Sheet

(56) References Cited

U.S. PATENT DOCUMENTS

| | | |
|---|---|---|
| 2010/0162887 A1 | 7/2010 | Hagg et al. |
| 2011/0023717 A1 | 2/2011 | Itami |
| 2013/0327701 A1 | 12/2013 | Han et al. |
| 2014/0260986 A1 | 9/2014 | Ishizuka et al. |

FOREIGN PATENT DOCUMENTS

| | | |
|---|---|---|
| JP | S59-055307 | 3/1984 |
| JP | H01-111421 | 4/1989 |
| JP | H02-212501 | 8/1990 |
| JP | 2009-502724 | 1/2009 |
| JP | 2011-518661 | 6/2011 |
| JP | 2014176795 | 9/2014 |
| KR | 10-19950032288 | 12/1995 |
| KR | 10-0212039 | 8/1999 |
| KR | 10-20110118567 | 10/2011 |
| KR | 10-1254783 | 4/2013 |
| KR | 10-20130137238 | 12/2013 |
| KR | 10-20130137850 | 12/2013 |
| WO | 1991-014709 | 10/1991 |
| WO | WO9116356 | 10/1991 |
| WO | 2012173776 | 12/2012 |
| WO | 2016-047351 | 3/2016 |

OTHER PUBLICATIONS

International Search Report and Written Opinion of PCT/KR2018/015128, dated Apr. 19, 2019.

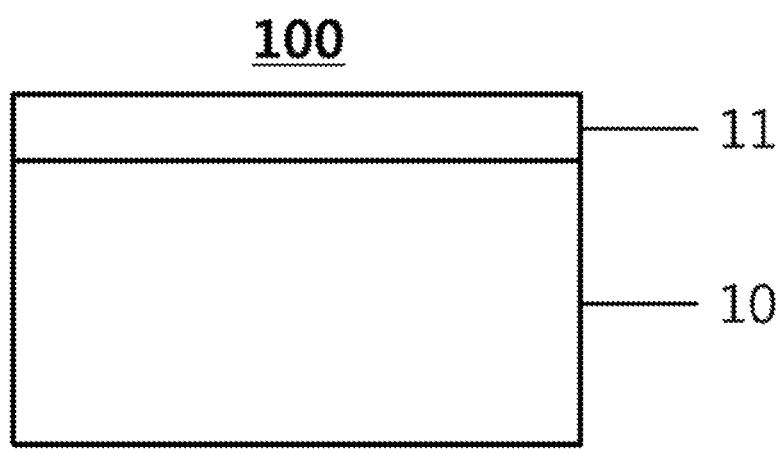

METHOD FOR PRODUCING COMPOSITION FOR FORMING GAS SEPARATION MEMBRANE ACTIVE LAYER, COMPOSITION FOR FORMING GAS SEPARATION MEMBRANE ACTIVE LAYER PRODUCED BY SAME, METHOD FOR MANUFACTURING GAS SEPARATION MEMBRANE, AND GAS SEPARATION MEMBRANE

CROSS-REFERENCE TO RELATED APPLICATIONS

This application is a National Stage Application of International Application No. PCT/KR2018/015128 filed on Nov. 30, 2018, which claims priority to and the benefit of Korean Patent Application No. 10-2017-0165055 filed in the Korean Intellectual Property Office on Dec. 4, 2017, the entire contents of which are incorporated herein by reference.

TECHNICAL FIELD

The present specification relates to a method for producing a composition for forming a gas separation membrane active layer, a composition for forming a gas separation membrane active layer produced thereby, a method for manufacturing a gas separation membrane, and a gas separation membrane.

BACKGROUND

A gas separation membrane is a membrane which is composed of a support layer, an active layer, and a protective layer, and selectively separates a gas from a mixed gas by using pore size and structural characteristics of the active layer. Accordingly, gas permeability and selectivity are used as important indices exhibiting the performance of the membrane, and these performances are greatly affected by polymer materials constituting the active layer.

Therefore, there is a need for developing a method for increasing the permeability and selectivity of a gas separation membrane.

DETAILED DESCRIPTION

Technical Problem

The present specification has been made in an effort to provide a method for producing a composition for forming a gas separation membrane active layer, a composition for forming a gas separation membrane active layer produced thereby, a method for manufacturing a gas separation membrane, and a gas separation membrane.

Technical Solution

An exemplary embodiment of the present specification provides a method for producing a composition for forming a gas separation membrane active layer, the method including: obtaining a first reactant by allowing a cellulose-based compound and an acid substituted with fluorine to react; and adding dropwise an acid anhydride substituted with fluorine to the first reactant at a temperature higher than room temperature.

Another exemplary embodiment of the present specification provides a composition for forming a gas separation membrane active layer produced by the above-described production method.

An exemplary embodiment of the present specification provides a composition for forming a gas separation membrane active layer, including a unit of Formula 1:

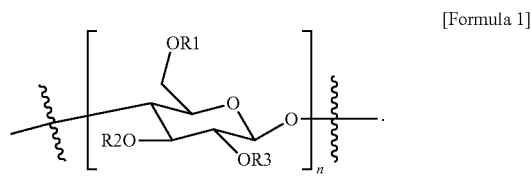

[Formula 1]

In Formula 1, n is a repeating number of the unit and is 1 to 1,000,

R1 to R3 are the same as or different from each other, and are each independently hydrogen or —(CO)CF$_3$, and at least one of R1 to R3 is —(CO)CF$_3$.

Another exemplary embodiment of the present specification provides a method for manufacturing a gas separation membrane, the method including: producing a composition for forming a gas separation membrane active layer according to the above-described method for producing a composition for forming a gas separation membrane active layer; forming a porous support by applying a hydrophilic polymer solution onto a porous substrate; and forming an active layer by applying the composition for forming a gas separation membrane active layer onto the porous support.

Further, an exemplary embodiment of the present specification provides a gas separation membrane including: a porous support; and an active layer including the unit of Formula 1 provided on the porous support.

Advantageous Effects

The gas separation membrane according to an exemplary embodiment of the present specification has excellent carbon dioxide permeability and selectivity of carbon dioxide to methane.

BRIEF DESCRIPTION OF DRAWINGS

FIG. 1 illustrates a gas separation membrane according to an exemplary embodiment of the present specification.

EXPLANATION OF REFERENCE NUMERALS AND SYMBOLS

100: Gas separation membrane
10: Porous support
11: Active layer

DETAILED DESCRIPTION

Hereinafter, the present specification will be described in more detail.

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element can be further included.

An exemplary embodiment of the present specification provides a method for producing a composition for forming a gas separation membrane active layer, the method including: obtaining a first reactant by allowing a cellulose-based compound and an acid substituted with fluorine to react; and adding dropwise an acid anhydride substituted with fluorine to the first reactant at a temperature higher than room temperature.

When a reaction is performed at room temperature during a process of synthesizing cellulose trifluoroacetate (CTFA), a process of mixing reactants, and then stirring the mixture for approximately 2 hours to 3 hours is required, and then a process of leaving the mixture to stand at room temperature for approximately 1 hour is required. However, when the reactants are allowed to react at a temperature higher than room temperature, the reaction can be terminated by allowing the reactants to react for 1 hour to 1.5 hours and the time for the reactants to be left to stand at room temperature is not required, so that there is an effect capable of reducing the reaction time.

In addition, with respect to reduction of the reaction time during the process of synthesizing the CTFA, since an acid substituted with fluorine and an acid anhydride substituted with fluorine used during the synthesis are strong acids, a cellulose polymer can be broken when exposed to the acids for a long period of time, so that it is possible to prevent a phenomenon in which the cellulose polymer is broken by reducing the time when the cellulose polymer is exposed to the acids.

According to an exemplary embodiment of the present specification, the acid substituted with fluorine can be an alkanoic acid having 2 to 10 carbon atoms substituted with at least one fluorine atom. The alkanoic acid can be acetic acid, propionic acid, butyric acid, valeric acid, caproic acid, enanthic acid, caprylic acid, pelargonic acid, capric acid, or the like, but is not limited thereto.

According to an exemplary embodiment of the present specification, the acid substituted with fluorine can be an alkanoic acid having 2 to 10 carbon atoms including a fluorine substituent.

According to an exemplary embodiment of the present specification, the acid substituted with fluorine can be an alkanoic acid having 2 to 6 carbon atoms including a fluorine substituent.

According to an exemplary embodiment of the present specification, the alkanoic acid can be preferably acetic acid.

According to an exemplary embodiment of the present specification, the acid substituted with fluorine can be trifluoroacetic acid (TFA).

According to an exemplary embodiment of the present specification, the acid substituted with fluorine can be an acid with a high purity of 99% or more.

According to an exemplary embodiment of the present specification, the acid anhydride substituted with fluorine can be an acid anhydride having 3 to 10 carbon atoms substituted with at least one fluorine atom. The alkanoic acid is as described above.

According to an exemplary embodiment of the present specification, the acid anhydride substituted with fluorine can be an acid anhydride having 3 to 10 carbon atoms substituted with fluorine.

According to an exemplary embodiment of the present specification, the acid anhydride substituted with fluorine can be an acid anhydride having 3 to 6 carbon atoms substituted with fluorine.

According to an exemplary embodiment of the present specification, the acid anhydride can be acetic anhydride, acetic formic anhydride, acetic propionic anhydride, propionic anhydride, acetic butyric anhydride, butyric propionic anhydride, succinic anhydride, glutaric anhydride, or the like, but is not limited thereto.

According to an exemplary embodiment of the present specification, the acid anhydride can be preferably acetic anhydride.

According to an exemplary embodiment of the present specification, the acid anhydride substituted with fluorine can be trifluoroacetic anhydride (TFAA).

According to an exemplary embodiment of the present specification, the acid anhydride substituted with fluorine can be an acid anhydride with a high purity of 99% or more.

According to an exemplary embodiment of the present specification, the cellulose-based compound can be cellulose.

According to an exemplary embodiment of the present specification, the temperature higher than room temperature can be 30° C. to 80° C. Specifically, the temperature higher than room temperature can be 40° C. to 70° C., more preferably 50° C. to 60° C. When a reaction is performed by setting the reaction temperature at room temperature during a process of synthesizing CTFA, a process of mixing reactants, and then stirring the mixture for approximately 2 hours to 3 hours is required, and then a process of leaving the mixture to stand at room temperature for approximately 1 hour is required. However, when the reactants are allowed to react at a temperature higher than room temperature, the reaction can be terminated by allowing the reactants to react for 1 hour to 1.5 hours and the time for the reactants to be left to stand at room temperature is not required, so that there is an effect capable of reducing the reaction time.

In addition, with respect to reduction of the reaction time during the process of synthesizing the CTFA, since TFA and TFAA used during the synthesis are strong acids, a cellulose polymer can be broken when exposed to the acids for a long period of time, so that it is possible to prevent a phenomenon in which the cellulose polymer is broken by reducing the time when the cellulose polymer is exposed to the acids.

According to an exemplary embodiment of the present specification, the adding dropwise of the acid anhydride substituted with fluorine to the first reactant at the temperature higher than room temperature can be adding dropwise the acid anhydride substituted with fluorine thereto for 10 minutes to 60 minutes. Preferably, the adding dropwise can be adding dropwise the acid anhydride substituted with fluorine thereto for 15 minutes to 50 minutes.

According to an exemplary embodiment of the present specification, a dropwise addition rate of the adding dropwise of the acid anhydride substituted with fluorine to the first reactant at the temperature than room temperature can be 2 ml/min to 5 ml/min. Specifically, it is preferred that the dropwise addition rate is 2 ml/min to 3 ml/min. When the rate of the dropwise addition is less than 2 ml/min, a long reaction time is required, which is uneconomical, and when the rate of the dropwise addition is more than 5 ml/min, the first reactant and the acid anhydride substituted with fluorine may not be sufficiently stirred.

According to an exemplary embodiment of the present specification, the method for producing a composition for forming a gas separation membrane active layer can further include, after the adding dropwise of the acid anhydride substituted with fluorine to the first reactant at the temperature higher than room temperature, precipitating the formed mixture in a first organic solvent.

According to an exemplary embodiment of the present specification, the first organic solvent can be a polar solvent.

According to an exemplary embodiment of the present specification, the first organic solvent can be an ether solvent, more preferably diethyl ether.

When the acid anhydride substituted with fluorine is added dropwise to the first reactant, a mixture in a gel state is obtained. When the mixture in a gel state is gradually poured into the first organic solvent, the cellulose-based compound substituted with fluorine is settled down as a precipitate, and the acid substituted with fluorine or the acid anhydride substituted with fluorine is dissolved in the first organic solvent. That is, it is preferred that the first organic solvent does not dissolve the cellulose-based compound substituted with fluorine, and dissolves well the acid substituted with fluorine or the acid anhydride substituted with fluorine.

Specifically, in the case of the precipitation in diethyl ether, the CTFA, which does not have good solubility in diethyl ether, is settled down as a precipitate, and the TFA or TFAA, which has good solubility in diethyl ether, is dissolved. Accordingly, the CTFA can be obtained as a precipitate.

According to an exemplary embodiment of the present specification, the composition for forming a gas separation membrane active layer can include a precipitate formed by precipitating the formed mixture in a first organic solvent after the adding dropwise of the acid anhydride substituted with fluorine to the first reactant at the temperature higher than room temperature.

According to an exemplary embodiment of the present specification, the method for producing a composition for forming a gas separation membrane active layer can further include dissolving the precipitate in a second organic solvent.

According to an exemplary embodiment of the present specification, the second organic solvent can be nitromethane.

According to an exemplary embodiment of the present specification, the method for producing a composition for forming a gas separation membrane active layer can include: obtaining a first reactant by allowing a cellulose-based compound and an acid substituted with fluorine to react; obtaining a mixture by adding dropwise an acid anhydride substituted with fluorine to the first reactant at a temperature higher than room temperature; obtaining a precipitate by precipitating the mixture in a first organic solvent; and dissolving the precipitate in a second organic solvent.

According to an exemplary embodiment of the present specification, the composition for forming a gas separation membrane active layer can include nitromethane as a solvent other than the above-described precipitate.

According to an exemplary embodiment of the present specification, the composition for forming a gas separation membrane active layer can be composed of the above-described precipitate and nitromethane. In this case, the content of nitromethane can be 95 wt % to 97.1 wt % based on the total weight of the composition for forming a gas separation membrane active layer.

According to an exemplary embodiment of the present specification, the content of the cellulose-based compound substituted with fluorine can be 2.9 wt % to 5 wt % based on the total weight of the composition for forming a gas separation membrane active layer. When the content of the cellulose-based compound substituted with fluorine satisfies the above range, carbon dioxide and a —$CF_3$ functional group are easily adsorbed, so that the gas separation membrane can increase carbon dioxide permeability and selectivity.

An exemplary embodiment of the present specification provides a composition for forming a gas separation membrane active layer produced by a method for producing the above-described composition for forming a gas separation membrane active layer.

Furthermore, an exemplary embodiment of the present specification provides a composition for forming a gas separation membrane active layer, including a unit of Formula 1:

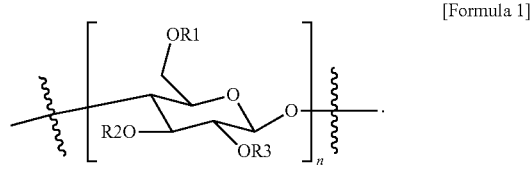

[Formula 1]

In Formula 1, n is a repeating number of the unit and is 1 to 1,000, and

R1 to R3 are the same as or different from each other, and are each independently hydrogen or —$(CO)CF_3$, and at least one of R1 to R3 is —$(CO)CF_3$.

According to an exemplary embodiment of the present specification, R1 can be —$(CO)CF_3$, and R2 and R3 can be hydrogen.

According to an exemplary embodiment of the present specification, R2 can be —$(CO)CF_3$, and R1 and R3 can be hydrogen.

According to an exemplary embodiment of the present specification, R3 can be —$(CO)CF_3$, and R1 and R2 can be hydrogen.

According to an exemplary embodiment of the present specification, R1 and R2 can be —$(CO)CF_3$, and R3 can be hydrogen.

According to an exemplary embodiment of the present specification, R1 and R3 can be —$(CO)CF_3$, and R2 can be hydrogen.

According to an exemplary embodiment of the present specification, R2 and R3 can be —$(CO)CF_3$, and R1 can be hydrogen.

According to an exemplary embodiment of the present specification, R1 to R3 can be —$(CO)CF_3$.

When a substituent having a chain length longer than —$(CO)CF_3$ is introduced into R1 to R3, the selectivity can be adversely affected. The reason is that as the packing density between polymer chains constituting the active layer is reduced due to the elongated chain, the permeabilities of carbon dioxide and methane are simultaneously increased, and accordingly, $CO_2/CH_4$ selectivity is reduced.

According to an exemplary embodiment of the present specification, when n is 2 or more, the structures in the parenthesis can be the same as or different from each other.

According to an exemplary embodiment of the present specification, the composition for forming a gas separation membrane active layer can further include a solvent in addition to the unit of Formula 1.

According to an exemplary embodiment of the present specification, the above-described description on the second organic solvent can be applied to the solvent.

According to an exemplary embodiment of the present specification, n is a repeating unit of the unit and can be 100 to 500. Preferably, n can be 100 to 300.

According to an exemplary embodiment of the present specification, the unit of Formula 1 can have a weight average molecular weight of 100 g/mol to 200,000 g/mol. The unit of Formula 1 can have a weight average molecular weight of preferably 10,000 g/mol to 200,000 g/mol, more preferably 100,000 g/mol to 200,000 g/mol. When the weight average molecular weight of the unit of Formula 1 satisfies the above range, the permeability of the gas separation membrane to carbon dioxide can be increased, and the selectivity of carbon dioxide as compared to a methane gas can be improved.

An exemplary embodiment of the present specification provides a method for manufacturing a gas separation membrane, the method including: producing a composition for forming a gas separation membrane active layer by a method according to the above-described method for producing a composition for forming a gas separation membrane active layer; forming a porous support by applying a hydrophilic polymer solution onto a porous substrate; and forming an active layer by applying the composition for forming a gas separation membrane active layer onto the porous support.

Another exemplary embodiment of the present specification provides a method for manufacturing a gas separation membrane, the method including: forming a porous support by applying a hydrophilic polymer solution onto a porous substrate; and forming an active layer by applying the above-described composition for forming a gas separation membrane active layer onto the porous support.

According to an exemplary embodiment of the present specification, the porous substrate can be used without limitation as long as the porous substrate is a material used as a support of a gas separation membrane, and for example, the porous substrate can be polyester, polypropylene, nylon, polyethylene, or a non-woven fabric, but is not limited thereto. Specifically, as the porous substrate, a non-woven fabric can be used.

According to an exemplary embodiment of the present specification, as the hydrophilic polymer, it is possible to use polysulfone, polyethersulfone, polycarbonate, polyethylene oxide, polyimide, polyetherimide, polyether ether ketone, polypropylene, polymethylpentene, polymethyl chloride, polyvinylidene fluoride, or the like, but the hydrophilic polymer is not always limited thereto. Specifically, the hydrophilic polymer can be polysulfone.

According to an exemplary embodiment of the present specification, the hydrophilic polymer solution can be formed by dissolving the hydrophilic polymer in a solvent. The solvent can be used without limitation as long as the solvent can dissolve a hydrophilic polymer. Examples thereof include acetone, acetonitrile, tetrahydrofuran (THF), dimethylsulfoxide (DMSO), dimethylformamide (DMF), hexamethylphosphoramide (HMPA), or the like, but are not limited thereto. The hydrophilic polymer can be included in an amount of 12 wt % to 20 wt % based on the hydrophilic polymer solution.

According to an exemplary embodiment of the present specification, as the method of applying the above-described composition for forming a gas separation membrane active layer onto the porous support, a method such as immersion, spray, or coating can be used, but the method is not limited thereto.

According to an exemplary embodiment of the present specification, the method of applying the above-described composition for forming a gas separation membrane active layer onto the porous support can be a slot-coating method.

Another exemplary embodiment of the present specification provides a gas separation membrane manufactured according to the above-described method for manufacturing a gas separation membrane.

Further, an exemplary embodiment of the present specification provides a gas separation membrane including: a porous support; and an active layer including the unit of Formula 1 provided on the porous support.

According to an exemplary embodiment of the present specification, the porous support can include a porous substrate and a hydrophilic polymer. That is, the porous support can be formed by applying a hydrophilic polymer solution onto the porous substrate. The above-described description can be applied to the porous substrate and the hydrophilic polymer solution.

According to an exemplary embodiment of the present specification, the gas separation membrane can have a thickness of 100 μm to 250 μm. When the thickness of the gas separation membrane satisfies the above range, there is an effect capable of preventing a phenomenon in which the gas permeability of the gas separation membrane is reduced.

According to an exemplary embodiment of the present specification, the porous support can have a thickness of 60 μm to 150 μm, but the thickness is not limited thereto, and can be adjusted, if necessary. Further, it is preferred that the porous support has a pore size of 1 nm to 500 nm, but the pore size is not limited thereto.

According to an exemplary embodiment of the present specification, the active layer can have a thickness of 1 μm to 5 μm, more preferably 1 μm to 3 μm.

According to an exemplary embodiment of the present specification, the gas separation membrane can have a selectivity of carbon dioxide of 5 to 40 based on methane. Specifically, the selectivity of carbon dioxide can be 10 to 35.

According to an exemplary embodiment of the present specification, the gas separation membrane can have a carbon dioxide permeability of 10 to 100. Specifically, the carbon dioxide permeability can be 12 to 80.

In the present specification, with respect to the "carbon dioxide ($CO_2$) permeability", after the gas separation membrane is fastened to the inside of a cell, a $CO_2$ single gas is pushed into the gas separation membrane under 80 psi, the gas is allowed to pass through the gas separation membrane, and then the flow rate of $CO_2$ permeated can be measured by a flowmeter. After the gas permeability of methane ($CH_4$) is measured by changing the type of gas by the aforementioned method, the $CO_2/CH_4$ selectivity can be measured by calculating the selectivity of carbon dioxide based on methane (permeability of $CO_2$/permeability of $CH_4$).

FIG. 1 exemplifies the structure of a gas separation membrane according to an exemplary embodiment of the present specification.

FIG. 1 exemplifies a gas separation membrane 100 including a porous support 10 formed by applying a hydrophilic polymer solution onto a porous substrate and an active layer 11 formed by applying a composition for forming an active layer provided onto the porous support 10. The composition for forming an active layer can include the unit of Formula 1.

Hereinafter, the present specification will be described in detail with reference to the Examples in order to specifically explain the present specification. However, the Examples according to the present specification can be modified in various forms, and it is not interpreted that the scope of the present specification is limited to the Examples described below in detail. The Examples of the present specification are provided to more completely explain the present specification to a person with ordinary skill in the art.

EXAMPLES

Experimental Example 1

Example 1

10 g of a cellulose powder and 200 ml of trifluoroacetic acid (TFA) were stirred under a nitrogen atmosphere. Thereafter, the reaction was performed at 60° C. for 1 hour and 30 minutes by adding dropwise 70 ml of trifluoroacetic anhydride (TFAA) thereto for 1 hour while maintaining the nitrogen atmosphere. After the reaction, cellulose trifluoroacetate (CTFA) was precipitated by gradually pouring a material in a gel state into a diethyl ether solvent.

A composition for forming an active layer was produced by putting 5 wt % of the CTFA into nitromethane.

A gas separation membrane was manufactured by applying, by slot coating, the composition for forming an active layer onto a UF support prepared by coating a porous non-woven fabric with a polysulfone solution.

Example 2

A gas separation membrane was manufactured in the same manner as in Example 1, except that a composition for forming an active layer was produced by using 2.9 wt % of CTFA instead of 5 wt % of CTFA in Example 1.

Comparative Example 1

A gas separation membrane was manufactured in the same manner as in Example 1, except that 5 wt % of cellulose acetate was used instead of 5 wt % of CTFA in Example 1.

Comparative Example 2

A gas separation membrane was manufactured in the same manner as in Example 1, except that 2.5 wt % of cellulose acetate was used instead of 5 wt % of CTFA in Example 1.

Comparative Example 3

A gas separation membrane was manufactured in the same manner as in Example 1, except that 5 wt % of fluorinated cellulose acetate having the following structure was used instead of 5 wt % of CTFA in Example 1.

Comparative Example 4

A gas separation membrane was manufactured in the same manner as in Example 1, except that 2.5 wt % of fluorinated cellulose acetate having the following structure was used instead of 5 wt % of CTFA in Example 1.

[Fluorinated Cellulose Acetate]

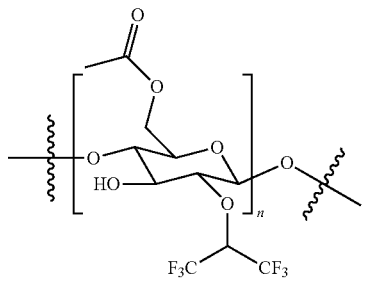

In Example 1, the results of analyzing the degree of substitution by NMR in accordance with the passage of the reaction time after addition of TFAA are shown in the following Table 1.

With respect to the gas separation membranes manufactured in Examples 1 and 2 and Comparative Examples 1 to 4, the gas permeabilities were evaluated by manufacturing TFC samples. Values of the carbon dioxide permeability, methane permeability, and carbon dioxide permeability as compared to methane were calculated and are shown in the following Table 2.

Gas permeation caused by difference in pressure between the upper portion and the lower portion of the membrane was induced by injecting gas under a certain pressure (50 psi, 80 psi, 100 psi, 200 psi, and the like) into the upper portion of a gas permeation cell at room temperature using a pressure regulator. In this case, the flow rate of gas passing through the separation membrane was measured by using a bubble flowmeter, and the permeability of the separation membrane was evaluated in consideration of the stabilization time (>1 hour).

TABLE 1

| Reaction time | Degree of substitution (%) |
| --- | --- |
| 0 min | 43 |
| 30 min | 42 |
| 60 min | 45 |
| 90 min | 40 |
| 120 min | 45 |
| 150 min | 45 |
| 180 min | 47 |
| 300 min | 48 |
| 24 hrs | 73 |

According to the results in Table 1, it could be confirmed that there was no significant change within around 45% of the degree of substitution until 300 minutes after the reaction. The polymer substituted with 70% or more of fluorine allowed to react for 24 hours could not be used as the gas separation membrane. When the degree of fluorine substitution is high, the gas adsorption ability due to fluorine can be improved, but the solubility of the polymer is decreased accordingly. In order to use a synthesized polymer, a polymer needs to be used by being dissolved in a specific solvent, that is, nitromethane, and in the case of a polymer having an excessively high degree of fluorine substitution, processability capable of being coated with the gas separation membrane deteriorates because there is no solvent capable of dissolving the polymer.

According to an exemplary embodiment of the present invention, when a CTFA having a degree of substitution of 40 to 45% allowed to react for 1 hour and 30 minutes after the addition of TFAA is used as a composition for forming an active layer, the drying process after forming the active layer is facilitated while the CTFA is dissolved properly in nitromethane.

TABLE 2

|  | Active layer polymer material | Content (wt %) | $P_{CO2}$ (GPU) | $P_{CH4}$ (GPU) | Selectivity ($CO_2$/$CH_4$) |
|---|---|---|---|---|---|
| Example 1 | CTFA | 5 | 12.5 | 0.394 | 32 |
| Example 2 | CTFA | 2.9 | 73 | 5 | 13 |
| Comparative Example 1 | Cellulose acetate | 5 | 5.7 | 2.8 | 2.0 |
| Comparative Example 2 | Cellulose acetate | 2.5 | 18.0 | 8.0 | 2.3 |
| Comparative Example 3 | Fluorinated cellulose acetate | 5 | 25.5 | 5.8 | 4.4 |
| Comparative Example 4 | Fluorinated cellulose acetate | 2.5 | 80.7 | 22.6 | 3.6 |

The $CO_2$/$CH_4$ selectivity means the gas selectivity of a carbon dioxide gas based on a methane gas.

According to Table 2, the gas separation membranes according to Examples 1 and 2 has a selectivity of carbon dioxide of 10 or more based on methane, and the gas separation membrane including cellulose trifluoroacetate (CTFA) in the active layer exhibited results which are excellent in carbon dioxide permeability and selectivity.

The gas separation membrane including CTFA in the active layer according to Example 1 has a $CO_2$/$CH_4$ selectivity improved by 16 times or more that of the gas separation membrane including cellulose acetate in the active layer according to Comparative Example 1 because the gas separation membrane according to Example 1 has a permeability of carbon dioxide, which is higher by 2 times or more, and a permeability of methane, which is lower by 7 times, than those of the gas separation membrane according to Comparative Example 1.

Likewise, the gas separation membrane including CTFA in the active layer according to Example 2 has a $CO_2$/$CH_4$ selectivity improved by 5.6 times or more that of the gas separation membrane including cellulose acetate in the active layer according to Comparative Example 2 because the gas separation membrane according to Example 2 has a permeability of carbon dioxide, which is higher by 4 times or more, and a permeability of methane, which is lower by 1.6 times, than those of the gas separation membrane according to Comparative Example 2.

Further, the gas separation membranes according to Examples 1 and 2 have a $CO_2$/$CH_4$ selectivity, which is higher by 2 times or more and up to 8 times or more those of the gas separation membranes according to Comparative Examples 3 and 4. Through this, it can be confirmed that when the length of the chain of the substituent is elongated, the permeability of gas is increased, but the selectivity is decreased. The reason is that the packing density between the chains of the polymer constituting the active layer is decreased due to the elongated chains, and the selectivity is decreased while the permeabilities of carbon dioxide and methane are simultaneously increased.

Although the preferred exemplary embodiments of the present invention have been described above, the present invention is not limited thereto, and various modifications can be made and carried out within the scope of the claims and the detailed description of the invention, and also fall within the scope of the invention.

The invention claimed is:

1. A method for producing a composition for forming a gas separation membrane active layer, the method comprising:
    obtaining a first reactant by reacting a cellulose-based compound with an acid substituted with fluorine; and
    adding dropwise an acid anhydride substituted with fluorine to the first reactant at a temperature higher than room temperature to form a mixture; and
    precipitating the mixture in a first organic solvent to yield a cellulose-based compound substituted with fluorine.

2. The method of claim 1, further comprising dissolving the cellulose-based compound substituted with fluorine in a second organic solvent to yield the composition for forming a gas separation membrane active layer, wherein an amount of the cellulose-based compound substituted with fluorine is 2.9 wt % to 5 wt % based on a total weight of the composition for forming a gas separation membrane active layer.

3. The method of claim 1, wherein the acid substituted with fluorine is an alkanoic acid having 2 to 10 carbon atoms, in which at least one carbon atom is substituted with fluorine.

4. The method of claim 1, wherein the acid anhydride substituted with fluorine is an acid anhydride having 3 to 10 carbon atoms, in which at least one carbon atom is substituted with fluorine.

5. The method of claim 1, wherein the acid substituted with fluorine is trifluoroacetic acid.

6. The method of claim 1, wherein the acid anhydride substituted with fluorine is trifluoroacetic anhydride.

7. The method of claim 1, wherein the temperature higher than room temperature is 30° C. to 80° C.

8. A composition for forming a gas separation membrane active layer produced by the method of claim 1.

9. A composition for forming a gas separation membrane active layer, comprising a unit of Formula 1:

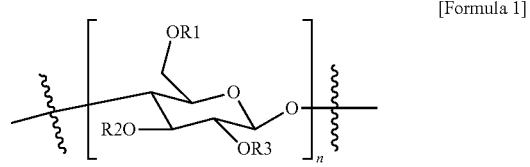

[Formula 1]

wherein in Formula 1:
    n is a repeating number of the unit and is 1 to 1,000, and
    R1 to R3 are the same as or different from each other, and each independently is hydrogen or —(CO)CF$_3$, and at least one of R1 to R3 is —(CO)CF$_3$.

10. The composition of claim 9, further comprising a second organic solvent.

11. The composition of claim 10, wherein the second organic solvent is nitromethane.

12. The composition of claim 10, wherein an amount of the unit of Formula 1 in the composition is 2.9 wt % to 5 wt % based on a total weight of the composition for forming a gas separation membrane active layer.

13. The composition of claim 10, wherein an amount of the second organic solvent in the composition is 95 wt % to 97.1 wt % based on a total weight of the composition for forming a gas separation membrane active layer.

14. A method for manufacturing a gas separation membrane, the method comprising:
    producing a composition for forming a gas separation membrane active layer by the method of claim 2;
    forming a porous support by applying a hydrophilic polymer solution onto a porous substrate; and
    forming an active layer by applying the composition for forming a gas separation membrane active layer onto the porous support.

15. The method of claim 14, wherein the porous substrate is a porous non-woven fabric.

16. The method of claim 14, wherein the method for applying a composition for forming an active layer is a slot coating method.

17. The method of claim 14, wherein the hydrophilic polymer is one or more selected from the group consisting of polysulfone, polyethersulfone, polycarbonate, polyethylene oxide, polyimide, polyetherimide, polyether ether ketone, polypropylene, polymethylpentene, polymethyl chloride, polyvinylidene fluoride, and a mixture thereof.

18. A gas separation membrane, comprising:
    a porous support; and
    an active layer comprising a unit of Formula 1 provided on the porous support:

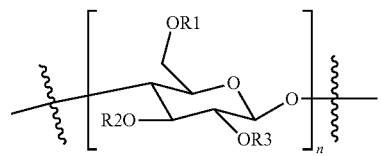

[Formula 1]

wherein in Formula 1:

n is a repeating number of the unit and is 1 to 1,000; and

R1 to R3 are the same as or different from each other, and are each independently hydrogen or —(CO)CF$_3$, and at least one of R1 to R3 is —(CO)CF$_3$.

19. The gas separation membrane of claim 18, wherein the porous support comprises a porous non-woven fabric and a hydrophilic polymer.

20. The gas separation membrane of claim 18, wherein the gas separation membrane has a selectivity of carbon dioxide of 5 to 40 based on methane.

\* \* \* \* \*